(12) United States Patent
Andou et al.

(10) Patent No.: US 7,931,332 B2
(45) Date of Patent: Apr. 26, 2011

(54) REAR-SEAT OCCUPANT PROTECTION APPARATUS

(75) Inventors: Yasuyuki Andou, Hiroshima (JP); Kouichi Nakano, Hiroshima (JP); Shiro Nakatani, Hiroshima (JP); Yukio Nakamura, Hiroshima (JP)

(73) Assignee: Mazda Motor Corporation (JP)

( * ) Notice: Subject to any disclaimer, the term of this patent is extended or adjusted under 35 U.S.C. 154(b) by 0 days.

(21) Appl. No.: 12/323,636

(22) Filed: Nov. 26, 2008

(65) Prior Publication Data

US 2009/0140559 A1    Jun. 4, 2009

(30) Foreign Application Priority Data

Nov. 30, 2007    (JP) .................. 2007-310973

(51) Int. Cl.
*B60N 2/42*      (2006.01)
*B60N 2/427*     (2006.01)
*B60R 21/013*    (2006.01)
*B60R 21/0132*   (2006.01)
*B60R 21/0134*   (2006.01)
*B60R 21/0136*   (2006.01)

(52) U.S. Cl. ................................. 297/216.13
(58) Field of Classification Search .............. 297/216.13
See application file for complete search history.

(56) References Cited

U.S. PATENT DOCUMENTS

| | | | | |
|---|---|---|---|---|
| 5,468,045 A | * | 11/1995 | Weber | 297/216.13 X |
| 5,676,421 A | * | 10/1997 | Brodsky | 297/216.13 |
| 5,746,467 A | * | 5/1998 | Jesadanont | 297/216.13 X |
| 5,810,417 A | * | 9/1998 | Jesadanont | 297/216.13 X |
| 6,135,561 A | * | 10/2000 | Kruger et al. | 297/216.13 X |
| 6,209,955 B1 | * | 4/2001 | Seibold | 297/216.13 |
| 7,441,838 B2 | * | 10/2008 | Patwardhan | 297/216.13 |

FOREIGN PATENT DOCUMENTS

JP    2004-224241    8/2004

* cited by examiner

*Primary Examiner* — Rodney B White
(74) *Attorney, Agent, or Firm* — Studebaker & Brackett PC; Donald R. Studebaker

(57) ABSTRACT

Disclosed is a rear-seat occupant protection apparatus, which is designed to protect, during a frontal collision of a vehicle, a rear-seat occupant (B) seated in a rear seat (5) located behind a front seat (3) equipped with a seat belt (7) having a load limiter function. The rear-seat occupant protection apparatus comprises a collision detection device (25) adapted to detect the frontal collision of the vehicle, and a seat-back displacing mechanism adapted, when the frontal collision of the vehicle is detected by the collision detection device, to permit a seat back (12) of the front seat (3) to be displaced frontwardly at a given timing consecutive with a frontward displacement of a front-seat occupant (A) seated in the front seat (3). The rear-seat occupant protection apparatus of the present invention can adequately protect a head of the rear-seat occupant during the frontal collision of the vehicle.

16 Claims, 12 Drawing Sheets

REAR-SEAT OCCUPANT PROTECTION APPARATUS

BACKGROUND OF THE INVENTION

1. Field of the Invention

The present invention relates to a rear-seat occupant protection apparatus designed to protect an occupant seated in a rear seat.

2. Description of the Background Art

Heretofore, there has been known a vehicle occupant protection apparatus which comprises an acceleration sensor adapted to detect a collision of a vehicle based on an acceleration of the vehicle, a lower-leg restraint unit (active bolster) adapted to restrain a lower leg of an occupant, a drive unit adapted, in response to receiving an output signal of the acceleration sensor, to actuate the lower-leg restraint unit, wherein the lower-leg restraint unit is disposed in a seat back of a front seat to restrain a lower leg of an occupant seated in a rear seat located behind the front seat, during a frontal collision of the vehicle, as disclosed, for example, in JP 2004-224241A.

The vehicle occupant protection apparatus as disclosed in the above patent document has an advantage of being able to restrain a lower leg of an occupant seated in a rear seat during a frontal collision of a vehicle to thereby suppress an amount of displacement of the occupant seated in the rear seat in a frontward direction of the vehicle.

However, in the technique of restraining only the lower leg of the rear-seat occupant during the frontal collision of the vehicle, as disclosed in the above patent document, there is a problem that a possibility of occurrence of the following undesirable situation cannot be denied. For example, if a relatively large impact load (inertia force) is applied to the rear-seat occupant due to the frontal collision of the vehicle, an upper body of the rear-seat occupant is significantly lunged frontwardly to cause a head of the rear-seat occupant to strike the seat back of the front seat, and thereby a large impact is applied to the head of the rear-seat occupant.

SUMMARY OF THE INVENTION

In view of the above circumstances, it is an object of the present invention to provide a rear-seat occupant protection apparatus capable of adequately protecting a head of a rear-seat occupant during a frontal collision of a vehicle.

In order to achieve this object, the present invention provides a rear-seat occupant protection apparatus designed to protect, during a frontal collision of a vehicle, a rear-seat occupant seated in a rear seat located behind a front seat equipped with a seat belt having a load limiter function. The rear-seat occupant protection apparatus comprises a collision detection device adapted to detect the frontal collision of the vehicle, and a seat-back displacing mechanism adapted, when the frontal collision of the vehicle is detected by the collision detection device, to permit a seat back of the front seat to be displaced frontwardly at a given timing consecutive with a frontward displacement of a front-seat occupant seated in the front seat.

BRIEF DESCRIPTION OF THE DRAWINGS

FIGS. 9A and 9B are explanatory diagrams showing a movement of the lock device after release of the lock, wherein FIG. 9A shows a state in the middle of the movement, and FIG. 9B shows a state after completion of the movement.

FIGS. 12A and 12B are explanatory diagrams showing a movement of a front seat and others during a frontal collision of a vehicle using the rear-seat occupant protection apparatus according to the second embodiment, wherein FIG. 12A and FIG. 12B show respective states before and after a seat back of the front seat is inclined frontwardly.

DESCRIPTION OF THE PREFERRED EMBODIMENTS

First Embodiment

Figure 1:
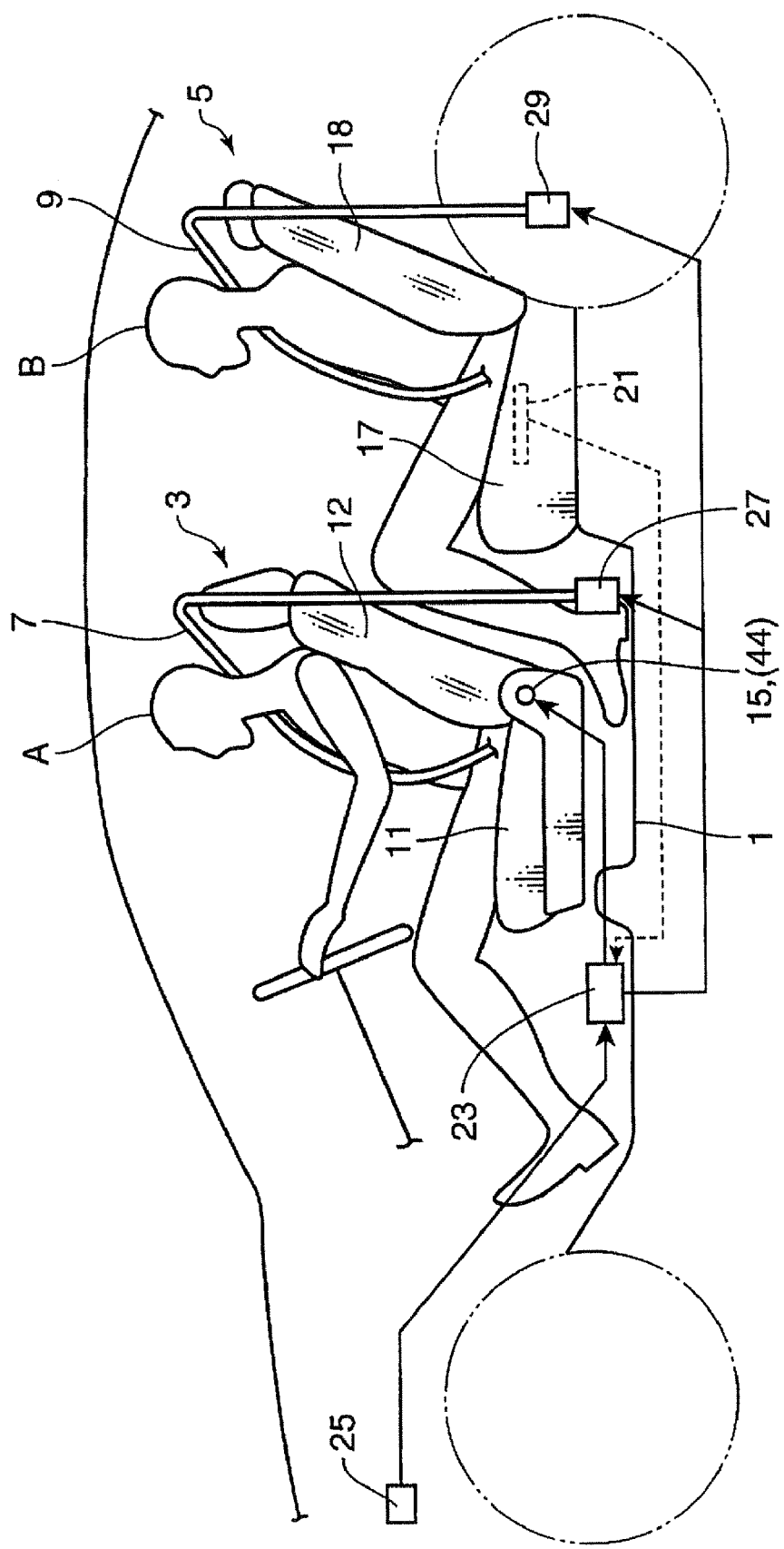
FIG. 1 is a schematic diagram showing a general structure of a vehicle using a rear-seat occupant protection apparatus according to a first embodiment of the present invention.

FIG. 1 shows a general structure of a vehicle using a rear-seat occupant protection apparatus according to a first embodiment of the present invention. As shown in FIG. 1, a front seat 3 consisting of a driver seat or a front passenger seat, and a rear seat 5 located behind the front seat 3, are arranged on a floor 1 of a passenger compartment of the vehicle. The front seat 3 is equipped with a seat belt 7 for restraining an occupant A seated therein (front-seat occupant A), and the rear seat 5 is also equipped with a seat belt 9 for restraining an occupant B seated therein (rear-seat occupant B).

The front seat 3 comprises a seat cushion 11, and a seat back 12 pivotally supported by a rear end of the seat cushion 11 through a reclining mechanism 15 in such a manner that the seat back 12 is inclined in a frontward-rearward direction of the vehicle about a lower end thereof when the reclining mechanism 15 is manually operated by a front-seat occupant A. The rear seat 5 comprises a seat cushion 17 and a seat back 18, wherein the seat cushion 17 incorporates a pressure sensor 21 adapted to detect a presence or absence of a rear-seat occupant B based on a pressure value applied to a seating surface of the seat cushion 17.

The pressure sensor 21 is electrically connected to a control unit 23 (equivalent to a control device set forth in the appended claims) comprising a CPU and various memories. The control unit 23 is also electrically connected with each of a collision sensor 25 (equivalent to a collision detection device set forth in the appended claims) adapted to detect a presence or absence of a vehicle collision based on an acceleration value applied to the vehicle, and a lock device 44 (see FIG. 4, etc.; details thereof will be described later) provided in the reclining mechanism 15.

The seat belt 7 for the front seat 3 has one end windably held by a retractor 27 provided inside a lateral wall, such as a center pillar (not shown), of the passenger compartment. The retractor 27 is adapted, when a frontal collision of the vehicle is detected by the collision sensor 25, to restrict pull-out of the seat belt 7 by a given restricting force. That is, in the first embodiment, the seat belt 7 is designed as a so-called "seat belt having a load limiter function"(hereinafter referred to as "load limiting seat belt").

Figure 2:
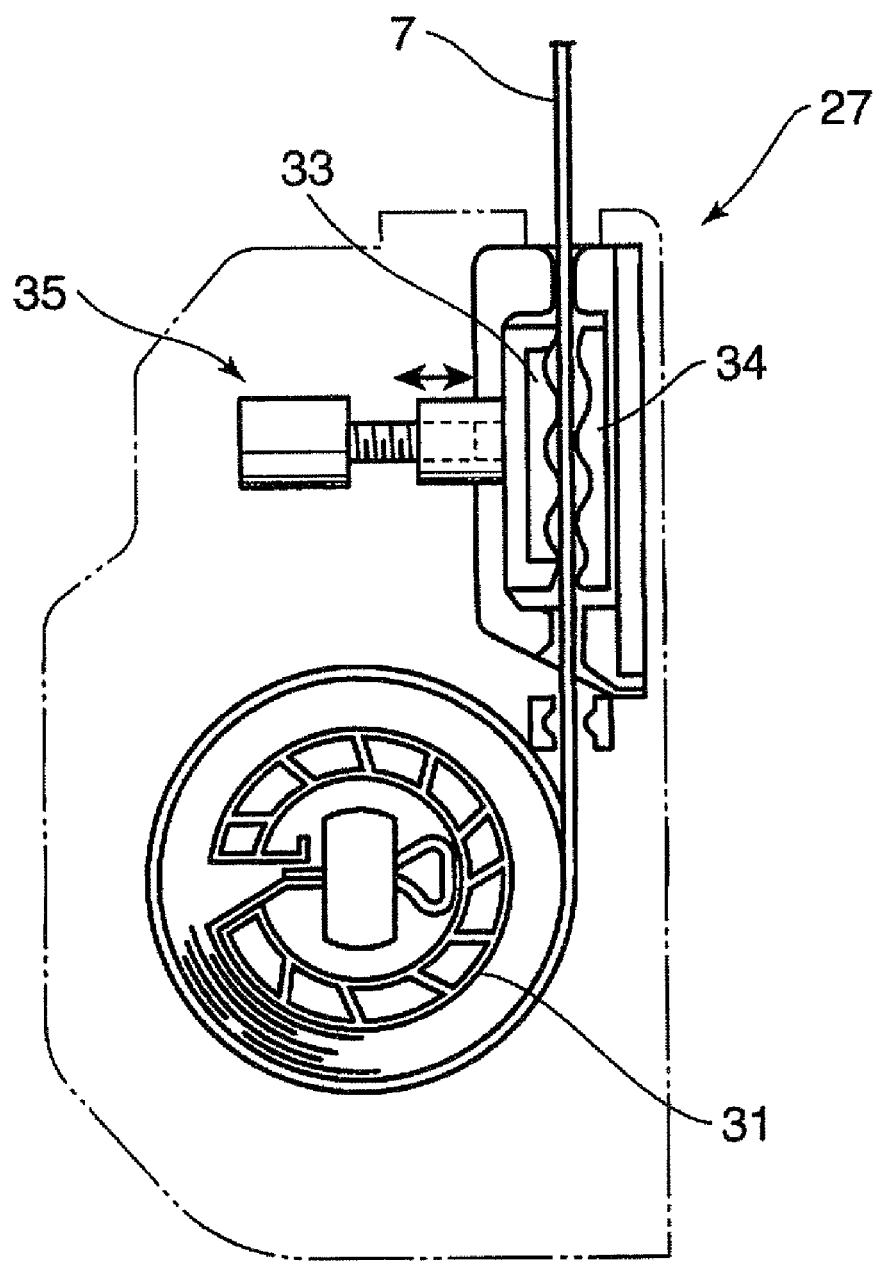
FIG. 2 is a schematic diagram showing a structure of a retractor.

FIG. 2 shows a structure of the retractor 27. As shown in FIG. 2, the retractor 27 includes a wind-up member 31 adapted to wind the seat belt 7, a pair of first and second clamps 33, 34 disposed in opposed relation to each other to clamp therebetween the seat belt 7 pulled out from the wind-up member 31 upwardly, and an actuator 35 adapted to pressingly move the first clamp 33 toward the second clamp 34. Specifically, in response to a control signal output from the control unit 23 when a frontal collision of the vehicle is detected by the collision sensor 25, the actuator 35 is activated to pressingly move the first clamp 33 toward the second clamp 34 to clamp the seat belt 7 between the first and second clamps 33, 34 by a given clamping force.

Further, when a pull-out force greater than the clamping force of the clamps 33, 34 is applied to the seat belt 7 according to a frontward load applied from a body of a front-seat occupant A during the frontal collision of the vehicle, the seat belt 7 is gradually pulled out upwardly while being slidingly moved relative to the clamps 33, 34, so that the restraint of the front-seat occupant A by the seat belt 7 is gradually released to permit a frontward displacement of the body of the front-seat occupant A within a given range. This provides an advantage of being able to effectively absorb impact energy to be applied to the front-seat occupant A, while effectively avoiding occurrence of an undesirable situation where the front-seat occupant A is forced to take an improper posture (e.g., a posture where only a head is largely lunged frontwardly under a condition that a torso is restrained), during the frontal collision of the vehicle.

As with the seat belt 7 for the front seat 3, the seat belt 9 for the rear seat 5 is designed as a load limiting seat belt. Specifically, the seat belt 9 for the rear seat 5 has one end windably held by a retractor 29 having the same structure as that of the retractor 27. The retractor 29 is adapted, during a frontal collision of the vehicle, to clamp the seat belt 9 between a pair of clamps (not shown) provided therein to thereby restrict a pull-out movement of the seat belt 9. Further, when a pull-out force greater than a clamping force of the clamps is applied from a rear-seat occupant B to the seat belt 9 during the frontal collision of the vehicle, the seat belt 9 is gradually pulled out against the clamping force to permit a frontward displacement of the rear-seat occupant B within a given range.

Figure 3:
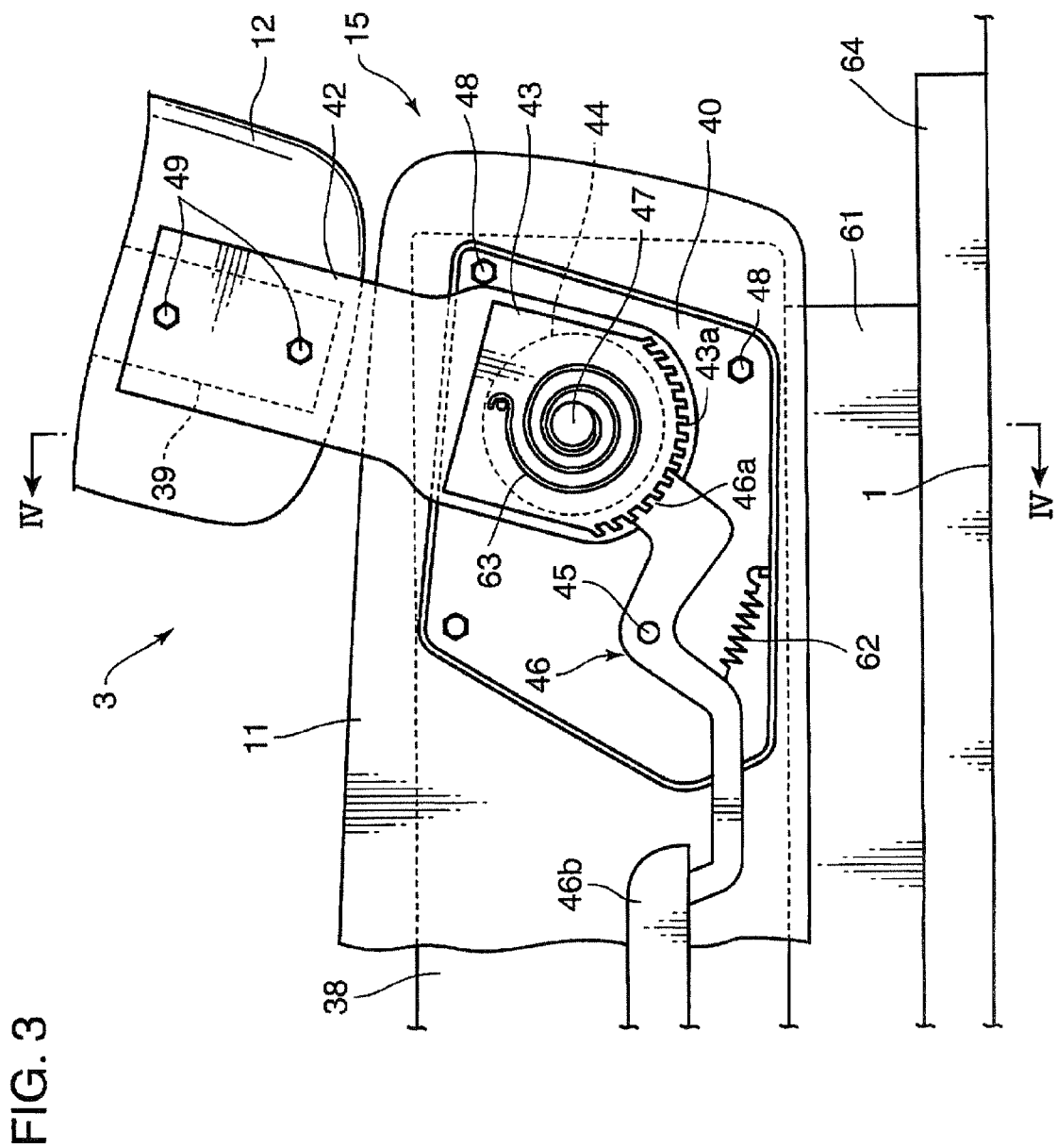
FIG. 3 is a side view showing a specific structure of a reclining mechanism provided in a front seat.
Figure 4:
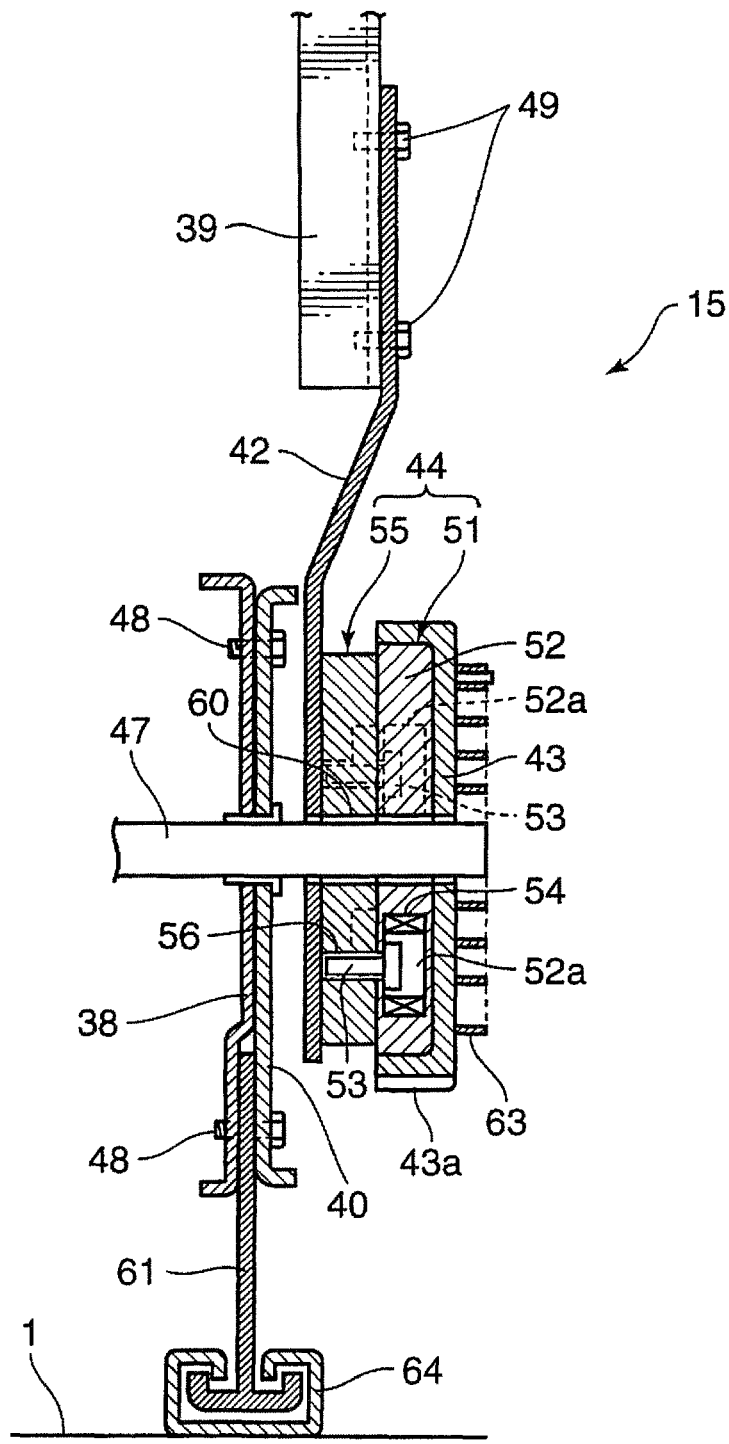
FIG. 4 is a sectional view taken along the line IV-IV in FIG. 3.

FIGS. 3 and 4 show a specific structure of the reclining mechanism 15 provided in the front seat 3. As shown in FIGS. 3 and 4, the reclining mechanism 15 comprises a base plate 40 attached to a lateral surface of a rear portion of the seat cushion 11, a connection member 42 connecting the base plate 40 and a lateral surface of a lower portion of the seat back 12, a gear plate 43 installed in a position which overlaps a lower portion of the connection member 42 in side view, a lock device 44 installed between the gear plate 43 and the connection member 42, a manual operation lever 46 pivotally supported by the base plate 40 through a support shaft 45, and a tension spring 62 biasing a frontward portion of the manual operation lever 46 downwardly about the support shaft 45 (i.e., biasing the manual operation lever 46 in a counterclockwise direction in FIG. 3). In FIGS. 3 and 4, the reference numeral 64 indicates a guide rail. This guide rail 64 is formed and arranged to allow a lower portion of a leg member 61 supporting the seat cushion 11, to be slidably engaged therewith.

The seat cushion 11 is internally provided with a seat cushion frame 38 extending in the frontward-rearward direction along a lateral surface portion thereof, and the base plate 40 is fixed to a rear end of the seat cushion frame 38 through a fastening bolt 48. The seat back 12 is internally provided with a seat back frame 39 extending in an upward-downward direction along a lateral surface portion thereof, and an upper portion of the connection member 42 is fixed to a lower end of the seat back frame 39 through a fastening bolt 49.

In a normal state, the gear plate 43 is integrally attached to the connection member 42 through the lock device 44. Each of the connection member 42, the gear plate 43, and after-mentioned members (51, 55) of the lock device 44, is pivotally supported by the base plate 40 and the seat cushion frame 38 through a support shaft 47 extending in a widthwise (i.e., lateral) direction of the vehicle, and attached to a rear end of the seat cushion 11 in such a manner as to be rotatable about the support shaft 47. The support shaft 47 is fixedly attached to the base plate 40 and the seat cushion frame 38 in a non-rotatable manner relative thereto. Each of the connection member 42, the gear plate 43, and the after-mentioned members (51, 55) of the lock device 44, is formed with a through-hole (see FIG. 4) for allowing the support shaft 47 to penetrate therethrough. The gear plate 43 is provided with a torsion coil spring 63 biasing the connection member 42 in the counterclockwise direction in FIG. 3 (i.e., a direction causing the seat back 12 to be rotated frontwardly) about the support shaft 47.

As shown in FIG. 3, the manual operation lever 46 is installed to extend in the frontward-rearward direction along an outer lateral surface of the seat cushion 11. The manual operation lever 46 has a gear portion 46a formed in a rear edge thereof and adapted to be meshable with a gear portion 43a formed in a lower edge of the gear plate 43. The manual operation lever 46 is biased in the counterclockwise direction in FIG. 3 by an action of the tension spring 62 to maintain a meshed state between the gear portion 46a of the manual operation lever 46 and the gear portion 43a of the gear plate 43, so that a rotational displacement of the gear plate 43 about the support shaft 47 is restricted.

As a result of the restriction of the rotational displacement of the gear plate 43, the connection member 42 connected to the gear plate 43 through the lock device 44 is locked in such a manner as to be precluded from being rotationally displaced about the support shaft 47, so that the seat back 12 having a lower end fixed to the connection member 42 is locked in a posture where it stands up at a given standing angle relative to the seat cushion 11.

Under the condition that the gear plate 43 is locked by the manual operation lever 46 in the above manner, when a handle 46b provided at the front end of the manual operation lever 46 is manually pulled upwardly by a front-seat occupant A, the manual operation lever 46 is rotationally displaced in a clockwise direction in FIG. 3 about the support shaft 45, against a biasing force of the tension spring 62, and thereby the respective gear portions 46a, 43a of the manual operation lever 46 and the gear plate 43 are unmeshed to allow the lock of the gear plate 46 by the manual operation lever 46 to be released. Thus, the restriction on the rotation of the connection member 42 is released to allow the standing angle of the seat back 12 relative to the seat cushion 11 to be freely adjusted. Then, when the manual operation of pulling the handle 46b upwardly is released, the manual operation lever 46 is rotated in the counterclockwise direction according to the biasing force of the tension spring 62, and the respective gear portions 46a, 43a of the manual operation lever 46 and the gear plate 43 are returned to the meshed state to lock the gear plate 43.

Figure 5:
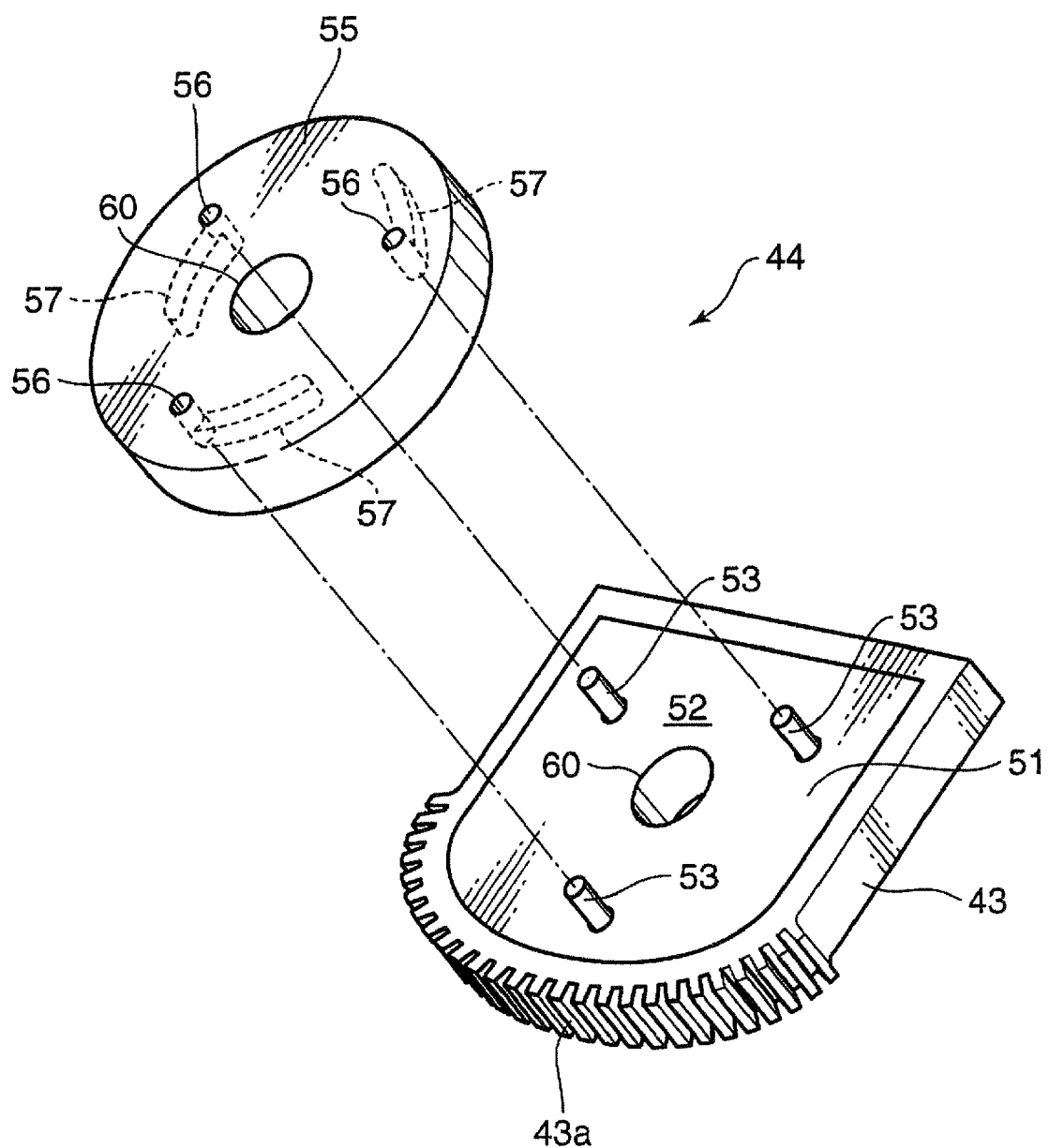
FIG. 5 is an exploded perspective view showing a lock device provided in the reclining mechanism.
Figure 6:
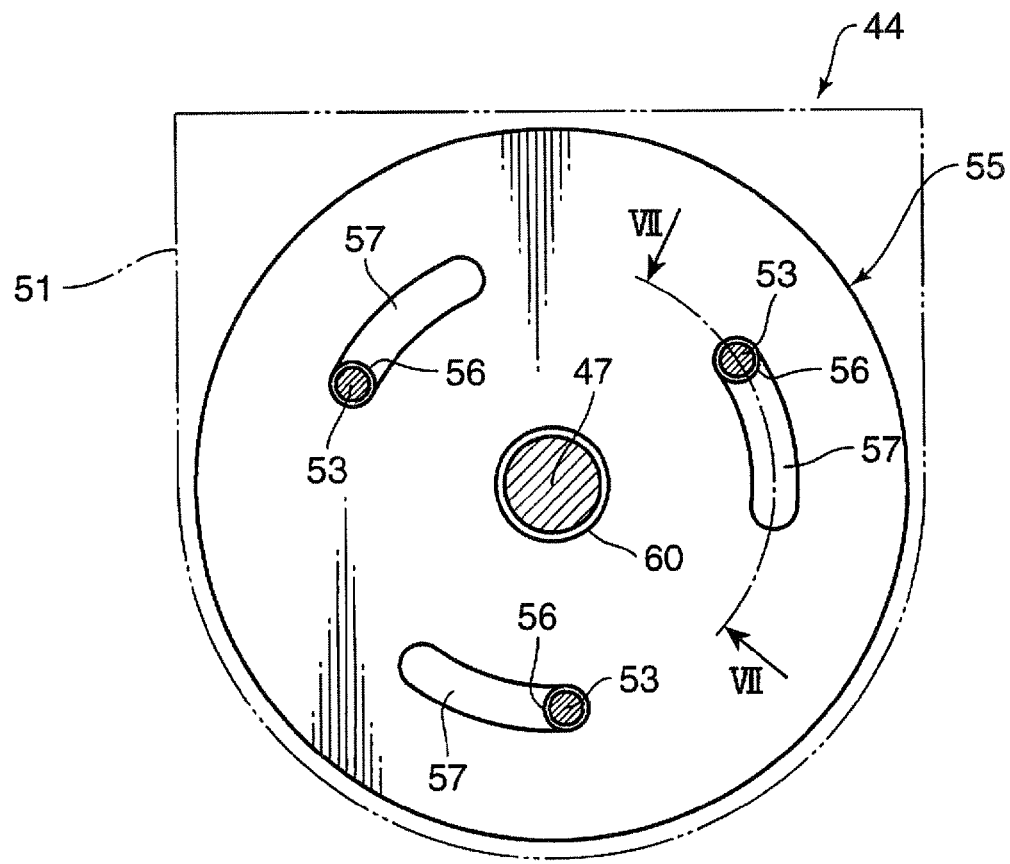
FIG. 6 is an explanatory diagram showing the lock device, wherein it is in a locked state.
Figure 7:
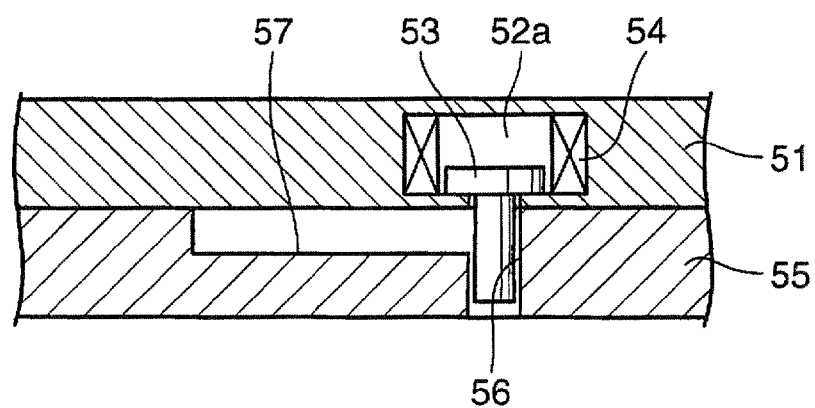
FIG. 7 is a sectional view taken along the line VII-VII in FIG. 6.

As shown in FIGS. 4 and 5, the lock device 44 includes an actuator member 51 integrally attached to an inner lateral surface (a surface on the side of the connection member 42) of the gear plate 43, and an engagement member 55 fixed to the lower portion of the connection member 42 through a fastening member (not shown) or the like. The actuator member 51 is provided with a plurality of (in the first embodiment, three) pins 53. Each of the pins 53 is inserted into a corresponding one of an after-mentioned plurality of through-holes 56 formed in the engagement member 55, so that the actuator member 51 and the engagement member 55 are engaged with each other to be held in a non-rotatable state.

The engagement member 55 is made up of a disk-shaped member having a given thickness, and formed with a plurality of through-holes 56 arranged in a circumferential direction thereof at approximately even intervals, and a plurality of shallow grooves 57 each extending continuously from a corresponding one of the through-holes 56. Each of the through-holes 56 is formed to have a diameter approximately equal to or slightly greater than that of each of the pins 53, and penetrate through the engagement member 55 in a thickness wise direction thereof. Each of the shallow grooves 57 is made up of a relatively shallow groove which does not penetrate through the engagement member 55 (in the illustrated embodiment, a depth of the shallow groove 57 is about one-half of a thickness of the engagement member 55), and formed to extend from the corresponding through-hole 56 over a given angular range in an arc pattern.

The actuator member 51 has a plate body 52 formed to have an outside dimension slightly less than that of the gear plate 43 and fixedly fitted into the gear plate 43, and the plurality of pins 53 are provided at positions corresponding to the respective through-holes 56 to protrude from the plate body 52. The plate body 52 has a plurality of pin-receiving portions 52a recessedly formed therein, and a base end of each of the pins 53 is received in a corresponding one of the pin-receiving portions 52a. Each of the pins 53 is biased by a biasing member (not shown) to protrude from the corresponding one of the pin-receiving portions 52a toward the engagement member 55, whereby, in the normal state, the pins 52 are maintained in such a manner that they are inserted into the respective through-holes 56 of the engagement member 55. In this manner, a rotation of the engagement member 55 relative to the actuator member 51 is restricted, and a relative rotation between the gear plate 43 and the connection member 42 connected together through the lock device 44 comprising the engagement member 55 and the actuator member 51 is restricted.

Each of the pin-receiving portions 52a of the plate body 52 is internally provided with an electromagnetic coil 54 for moving the pin 53 in an axial direction thereof. The electromagnetic coil 54 is electrically connected to the control unit 23 (see FIG. 1) via a wire harness (not shown) or the like. When a frontal collision of the vehicle is detected by the collision sensor 25 (see FIG. 1), the control unit 23 operates to supply a given amount of current to the electromagnetic coil 54, so that the electromagnetic coil 54 is excited to apply an electromagnetic force to the pin 53 in the axial direction, and thereby the pin 53 moves in a direction toward the pin-receiving portion 52a against a biasing force of the biasing member.

Figure 8:
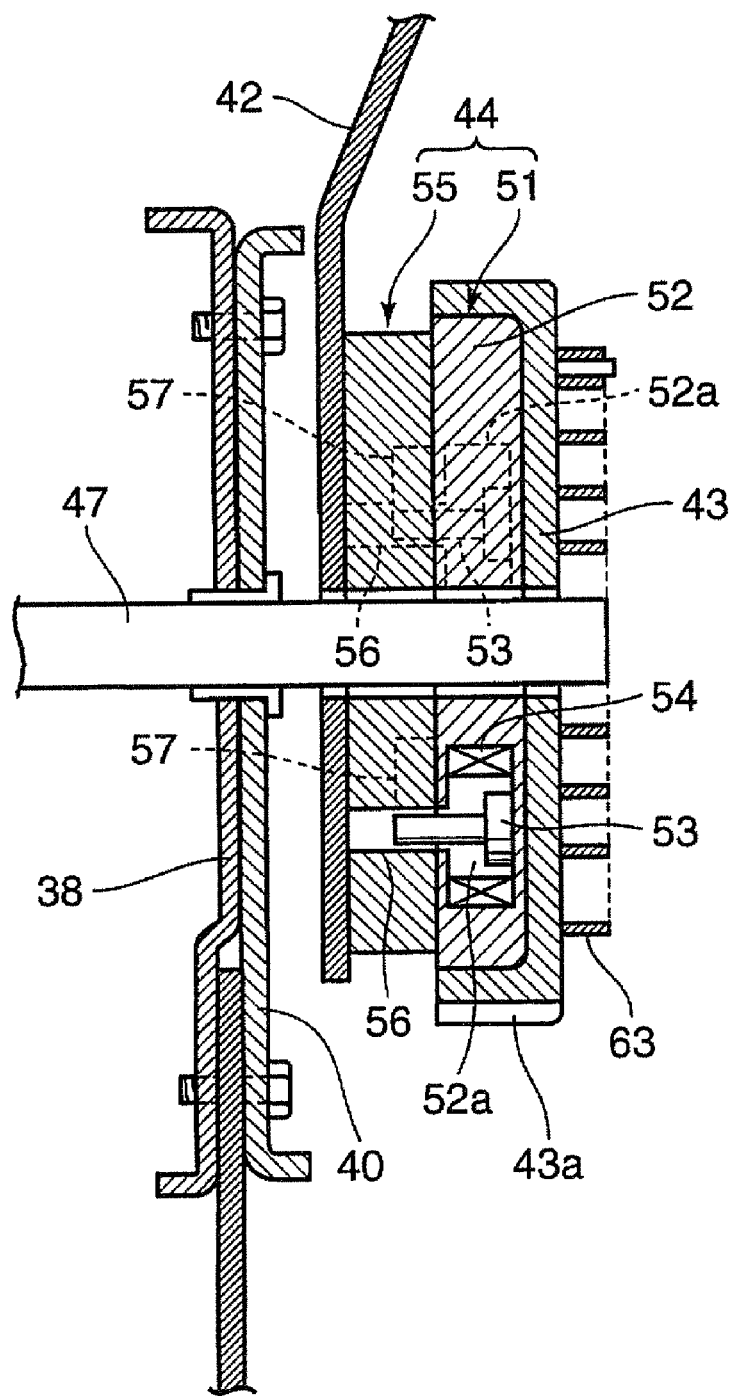
FIG. 8 is a sectional view showing the reclining mechanism in FIG. 4, wherein a lock by the lock device is released.
Figure 9A:
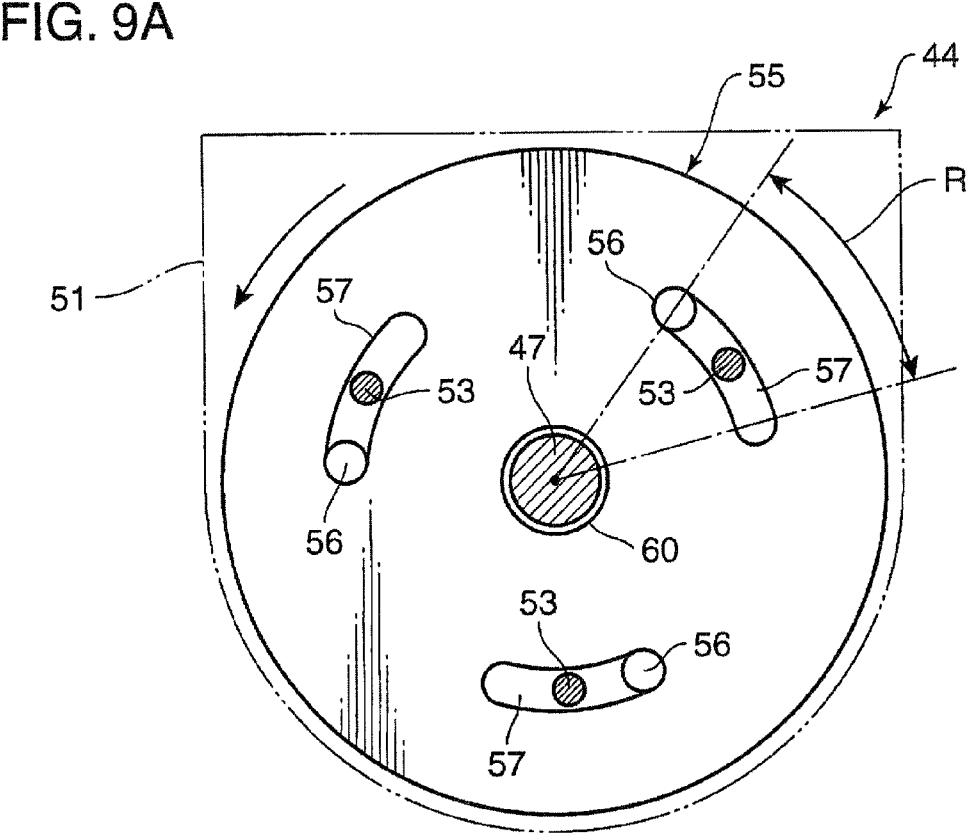
Figure 9B:
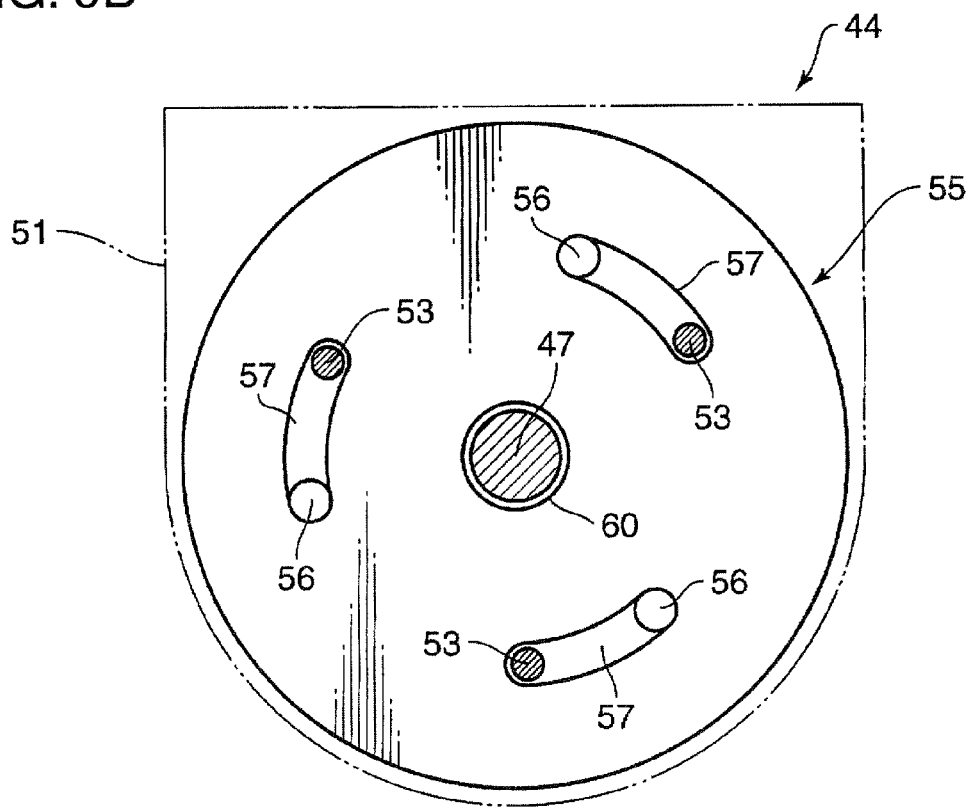
Figure 10:
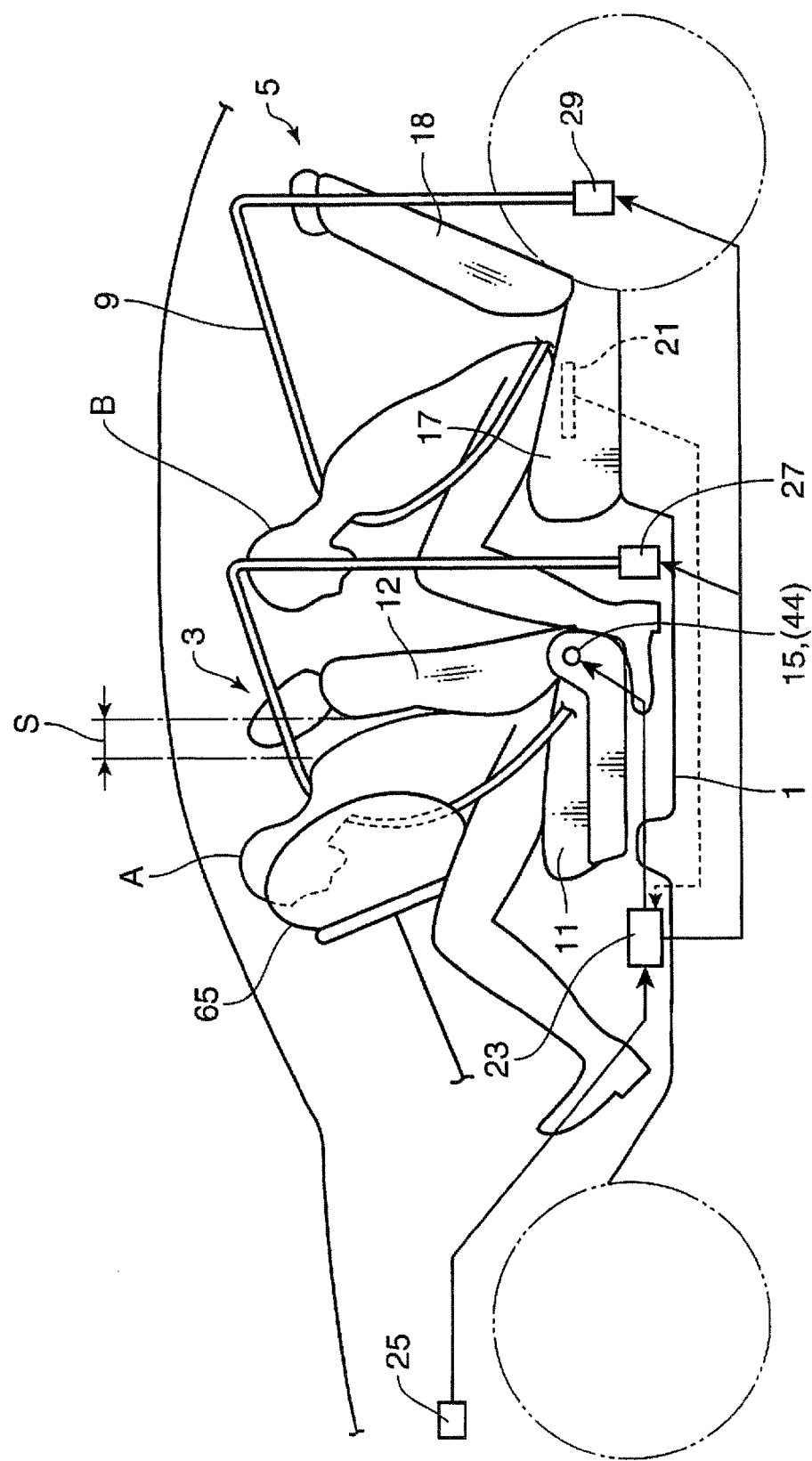
FIG. 10 is an explanatory diagram corresponding to FIG. 1, which shows a movement of the front seat and others during a frontal collision of the vehicle.

FIG. 8 shows a state after the pin 53 is retracted toward the pin-receiving portion 52a. As shown in FIG. 8, when the pin 53 is driven by the electromagnetic coil 54, it is moved to a retracted position where a protruding amount of the pin 5 becomes less than the depth of the shallow groove 57. Thus, an engagement state between the engagement member 55 and the actuator member 51 through the pins 53 is released to permit the engagement member 55 to be rotated relative to the actuator member 51 by an angle corresponding to the angular range R (see FIG. 9A) of each of the shallow grooves 57. That is, when the pin 53 is retracted toward the pin-receiving portion 52a, each of the pins 53 is disengaged from the corresponding one of the through-holes 56, and allowed to be displaced in the circumferential direction along the corresponding one of the shallow grooves 57. Thus, as shown in FIG. 9B, the engagement member 55 is permitted to be rotated relative to the actuator member 51 over the angular range R until each of the pins 53 reaches a distal end of the corresponding one of the shallow grooves 57 (i.e., an end of the shallow groove 57 on an opposite side of the through-hole 56). Then, when the engagement member 55 becomes rotatable in the above manner, the connection member 42 fixedly fastened to the engagement member 55 becomes rotationally displaceable in the counterclockwise direction in FIG. 3, and thereby the seat back 12 becomes inclinable frontwardly (i.e., in a direction causing the seat back 12 to be folded on the seat cushion 11), as shown in FIG. 10.

In the first embodiment, each of the shallow grooves 57 is formed to have a width dimension slightly greater than the diameter of each of the pins 53. Thus, when each of the pins 53 moves to the retracted position to release the engagement between the engagement member 55 and the actuator member 51, the engagement member 55 can be smoothly rotated relative to the actuator member 51. That is, when the engagement between the actuator member 51 and the engagement member 55 is released (i.e., when the lock between the gear plate 43 and the connection member 42 by the lock device 44 is released), the seat back 12 will be automatically and rapidly displaced frontwardly according to a frontward impact load applied thereto during a frontal collision of the vehicle.

As mentioned above, the seat belt 7 for the front seat 3 is designed as the load limiting seat belt. Thus, when a frontal collision of the vehicle is detected by the collision sensor 25, the seat belt 7 is gradually pulled out to allow the constraint of a body of a front-seat occupant A to be gradually released, so that a frontward displacement of the body of the front-seat occupant A is permitted in a given range, as shown in FIG. 10. Further, during the frontal collision of the vehicle, the control unit 25 operates to supply a current to the electromagnetic coil 54 of the actuator member 51 to move the pins 53 to the retracted position, so that the lock by the lock device 44 is released to permit a frontward displacement of the seat back 12 of the front seat 3. In this operation, the control unit 23 is configured to control a timing of the current supply to the electromagnetic coil 54 in such a manner that the frontward displacement of the seat back 12 is permitted at a timing consecutive with the frontward displacement of the front-seat occupant A, i.e., at approximately the same timing as the frontward displacement of the front-seat occupant A, or at a timing slightly later than the frontward displacement of the front-seat occupant A, to allow the lock by the lock device 44 to be released. That is, in the first embodiment, a seat-back displacing mechanism adapted, when a frontal collision of the vehicle is detected by the collision sensor 23, to permit the seat back 12 of the front seat 3 to be displaced frontwardly at a given timing consecutive with the frontward displacement of the front-seat occupant A, is made up of the lock device 44, and the control unit 23 adapted to control the lock release operation of the lock mechanism 44. In FIG. 10, the reference numeral 65 indicates an air bag installed in a steering wheel assembly or the like to protect a front-seat occupant A.

Based on the above function of the seat-back displacing mechanism capable of permitting the frontward displacement of the seat back 12 of the front seat 3 during a frontal collision of the vehicle, a rear-seat occupant B seated in the rear seat 5 located behind the front seat 3 can be adequately protected. Specifically, in the event of a frontal collision of the vehicle, the rear-seat occupant B seated in the rear seat 5 is displaced frontwardly while being restrained by the load limiting seat belt 9 for the rear seat 5. In this process, the above mechanism capable of permitting the frontward displacement of the seat back 12 during a frontal collision of the vehicle can prevent a head of the rear-seat occupant B from striking an upper end of the seat back 12 and receiving a large impact. Thus, safety for the rear-seat occupant B is adequately ensured.

As above, the seat-back displacing mechanism (the lock device 44 and the control unit 23) is provided as a means to protect a head of a rear-seat occupant B during a frontal collision of the vehicle. Thus, the operation of the seat-back displacing mechanism to displace the seat back 12, i.e., the operation of the control unit 23 to supply a current to the electromagnetic coil 54 of the actuator member 51 to allow the lock by the lock device 44 to be released, is performed only when a rear-seat occupant B is seated in the rear seat 5. Specifically, the control unit 23 is configured to supply a current to the electromagnetic coil 54 to allow the lock by the lock device 44 to be released, only when it is determined that a rear-seat occupant B is seated in the rear seat 5, based on a detection value of the pressure sensor 21 incorporated in the rear seat 5.

When the lock by the lock device 44 is released in the above manner to permit the frontward movement of the seat back 12, the seat back 12 is inclined frontwardly according to an impact load during the frontal collision, by an angle corresponding to the angular range R (see FIG. 9A) of each of the shallow grooves 57 formed in the engagement member 55, and stopped at the inclination angle. Specifically, in the first embodiment, in response to release of the lock by the lock device 44, the engagement member 55 is rotated relative to the actuator member 51 while allowing each of the pins 53 to be displaced relative to the engagement member 55 along a corresponding one of the shallow grooves 57. Thus, as shown in FIG. 9B, when each of the pins 53 reaches the distal end on the opposite side of the through-hole 56 in the corresponding one of the shallow grooves 57, i.e., when the engagement member 55 is rotated by an angle corresponding to the angular range R of each of the shallow grooves 57, the frontward displacement (frontward inclining) of the seat back 12 is stopped. That is, in the above structure, an amount of the frontward displacement of the seat back 12 during a frontal collision can be controlled by appropriately adjusting the angular range R of each of the shallow grooves 57.

More specifically, in the first embodiment, the angular range R of each of the shallow grooves 57 is set in such a manner that a displacement amount of the seat back 12 displaced frontwardly during a frontal collision of the vehicle becomes less than a displacement amount of an upper body of a front-seat occupant A which is displaced frontwardly while being restrained by the load limiting seat belt 7, as shown in FIG. 10 (i.e., in such a manner that a given gap S is ensured between an upper portion of the seat back 12 and the upper body of the front-seat occupant A). That is, in the first embodiment, a restriction device adapted, when the seat back 12 of the front seat 3 is permitted to be displaced frontwardly during a frontal collision of the vehicle, to restrict a displacement amount of the seat back 12 of the front seat 3 in such a manner that the amount becomes less than a displacement amount of an upper body of a front-seat occupant A which is displaced frontwardly while being restrained by the seat belt 7, is made up of the shallow grooves 57 formed in the engagement member 55, and the pins 53 each having a distal end adapted to be inserted into a corresponding one of the shallow grooves 57.

As described above, according to the first embodiment, the rear-seat occupant protection apparatus designed to protect, during a frontal collision of a vehicle, a rear-seat occupant B seated in a rear seat 5 located behind a front seat 3 equipped with a load limiting seat belt 7, is provided with the collision sensor 25 which serves as a collision detection device adapted to detect the frontal collision of the vehicle, and the seat-back displacing mechanism which is made up of the lock device 44 and the control unit 23, and adapted, when the frontal collision of the vehicle is detected by the collision sensor 25, to permit a seat back 12 of the front seat 3 to be displaced frontwardly at a given timing consecutive with a frontward displacement of a front-seat occupant A seated in the front seat 3. Thus, the rear-seat occupant protection apparatus has an advantage of being able to adequately protect a head of the rear-seat occupant B during a frontal collision of the vehicle.

Specifically, in the first embodiment, a frontward displacement of the seat back 12 of the front seat 3 is permitted in response to detection of a frontal collision of the vehicle by the collision sensor 25. This provides an advantage of being able to effectively avoid occurrence of an undesirable situation where, when the rear-seat occupant B seated behind the front seat 3 is lunged frontwardly due to a frontward impact load applied thereto during the frontal collision of the vehicle, the head of the rear-seat occupant B strikes the seat back 12 of the front seat 3 and receives a large impact, so as to more adequately protect the head of the rear-seat occupant B.

Further, the front seat 3 is equipped with the load limiting seat belt 7 which permits the frontward displacement of the front-seat occupant A in a given range during the frontal collision of the vehicle. In this case, the seat-back displacing mechanism adapted to permit the frontward displacement of the seat back 12 at a given timing consecutive with the frontward displacement of the front-seat occupant A makes it possible to prevent the seat back 12 located behind the front-seat occupant A from being displaced frontwardly ahead of the front-seat occupant A, so as to effectively avoid occurrence of an undesirable situation where the front-seat occupant A is urgedly pressed frontwardly and pushed down by the seat back 12. Thus, the seat-back displacing mechanism has an advantage of being able to adequately protect the head of the rear-seat occupant B seated behind the front seat 3 without spoiling safety for the front-seat occupant A seated in the front seat 3.

Particularly, in the rear-seat occupant protection apparatus according to the first embodiment, the restriction device made up of the pins 53 and the shallow grooves 57 is provided as a part of the seat-back displacing mechanism, and adapted, when the seat back 12 of the front seat 3 is permitted to be displaced frontwardly during the frontal collision of the vehicle, to restrict a displacement amount of the seat back 12 of the front seat 3 in such a manner that the amount becomes less than a displacement amount of an upper body of the front-seat occupant A which is displaced frontwardly while being restrained by the load limiting seat belt 7. In this case, even if the seat back 12 is displaced frontwardly during the frontal collision of the vehicle, the restriction device can prevent the seat back 12 from being brought into contact with the upper body of the front-seat occupant A to push the upper body. This provides an advantage of being able to more adequately ensure safety for the front-seat occupant A.

Further, as shown in the first embodiment, the seat-back displacing mechanism is made up of the lock device 44 adapted to lock the seat back 12 of the front seat 3 in a given standing posture (i.e., a posture where it stands up at a given standing angle relative to a rear end of a seat cushion 11 of the front seat 3), and the control unit 23 adapted, when the frontal collision of the vehicle is detected by the collision sensor 25, to move the engaging pins 53 provided in the lock device 44 to allow the lock by the lock device 44 to be released. This provides an advantage of being able to quickly permit the frontward displacement (frontward inclining) of the seat back 12 to adequately protect the head of the rear-seat occupant B seated behind the seat back 12, using only a simple structure adapted to move the engaging pins 53 of the lock device 44 during the frontal collision of the vehicle.

In the first embodiment, the rear seat 5 is equipped with the load limiting seat belt 9. This provides an advantage of being able to effectively prevent the head of the rear-seat occupant B from striking the seat back 12 of the front seat 3 and receiving a large impact, while impact energy applied to the rear-seat occupant B seated in the rear seat 5 is effectively absorbed by the seat belt 9.

Specifically, as the rear seat 5 is equipped with the load limiting seat belt 9, during the frontal collision of the vehicle, the seat belt 9 is gradually pulled out according to a load applied thereto from the rear-seat occupant B, so that the frontward displacement of the rear-seat occupant B is permitted in a given range. Further, under the condition that the rear-seat occupant B is displaced frontwardly during the frontal collision of the vehicle, the seat-back displacing mechanism adapted to permit the frontward displacement of the seat back 12 of the front seat 3 makes it possible to effectively prevent the head of the rear-seat occupant B from striking the seat back 12 and receiving a large impact, while impact energy applied to the rear-seat occupant B is effectively absorbed by the seat belt 9. This provides an advantage of being able to more adequately protect the rear-seat occupant B.

In the first embodiment, the pressure sensor 21 serving as an occupant detection device adapted to detect a presence or absence of a rear-seat occupant B is incorporated in the rear seat 5, and the seat-back displacing mechanism adapted to permit the frontward displacement of the seat back 12 only when it is determined that a rear-seat occupant B is seated in the rear seat 5, based on the detection of the pressure sensor 21. This provides an advantage of being able to avoid occurrence of an undesirable situation where the seat-back displacing mechanism is unnecessarily activated irrespective of an absence of a rear-seat occupant B, so as to adequately perform the operation of displacing the seat back 12, depending on occupant seating conditions.

Second Embodiment

Figure 11:
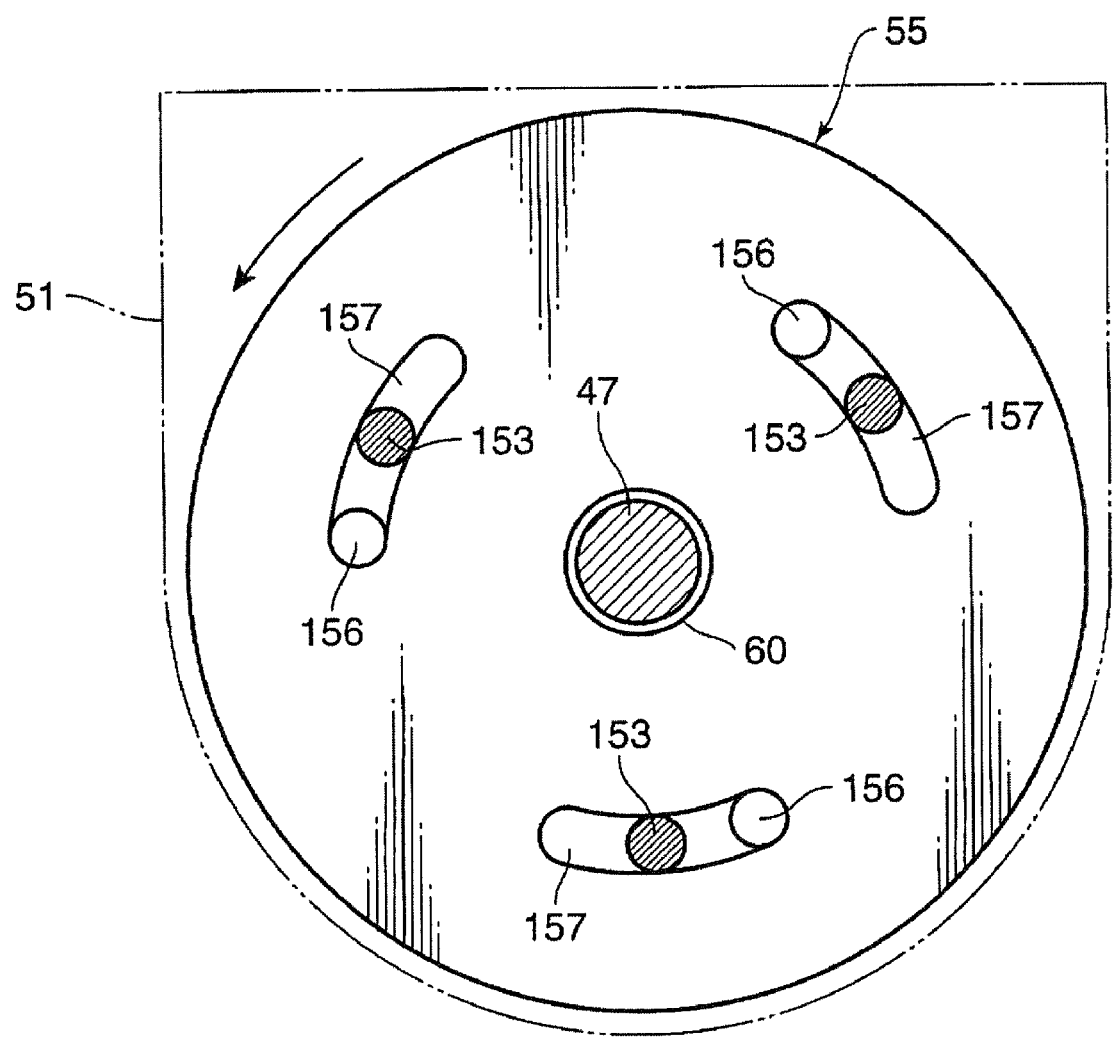
FIG. 11 is a schematic diagram showing a lock device in a rear-seat occupant protection apparatus according to a second embodiment of the present invention.

FIG. 11 is a schematic diagram showing a lock device in a rear-seat occupant protection apparatus according to a second embodiment of the present invention. The rear-seat occupant protection apparatus according to the second embodiment has the same structure as that of the rear-seat occupant protection apparatus according to the first embodiment, except for a part of the lock device. Thus, except for a lock device, the same element or component as that in the first embodiment is defined by a common reference numeral or code, and its description will be omitted. As shown in FIG. 11, in the second embodiment, a lock device 44 includes an engagement member 55 formed with a plurality of shallow grooves 157, and an actuator member 51 provided with a plurality of pins 153 in the same manner as that in the first embodiment, except that each of the shallow grooves 157 is formed to have a width equal to or slightly less than a diameter of each of the pins 153. That is, when the engagement member 55 is rotated relative to the actuator member 51 during a frontal collision of a vehicle, a given sliding resistance occurs between a groove wall of each of the shallow grooves 157 and a corresponding one of the pins 153. Thus, a given resistance force is imposed on a seat back 12 of a front seat 3 which is being displaced frontwardly during the frontal collision of the vehicle. Therefore, differently from the first embodiment, the seat back 12 is locked in a standing posture without being automatically displaced frontwardly according to any impact load during the frontal collision, unless a given external force is applied thereto. That is, in the second embodiment, a damper device adapted to impose a given resistance force on the seat back 12 during a frontward displacement thereof is made up of the pins 153, and the shallow grooves 157 each adapted to be brought into sliding contact with a corresponding one of the pins 153.

Figure 12A:
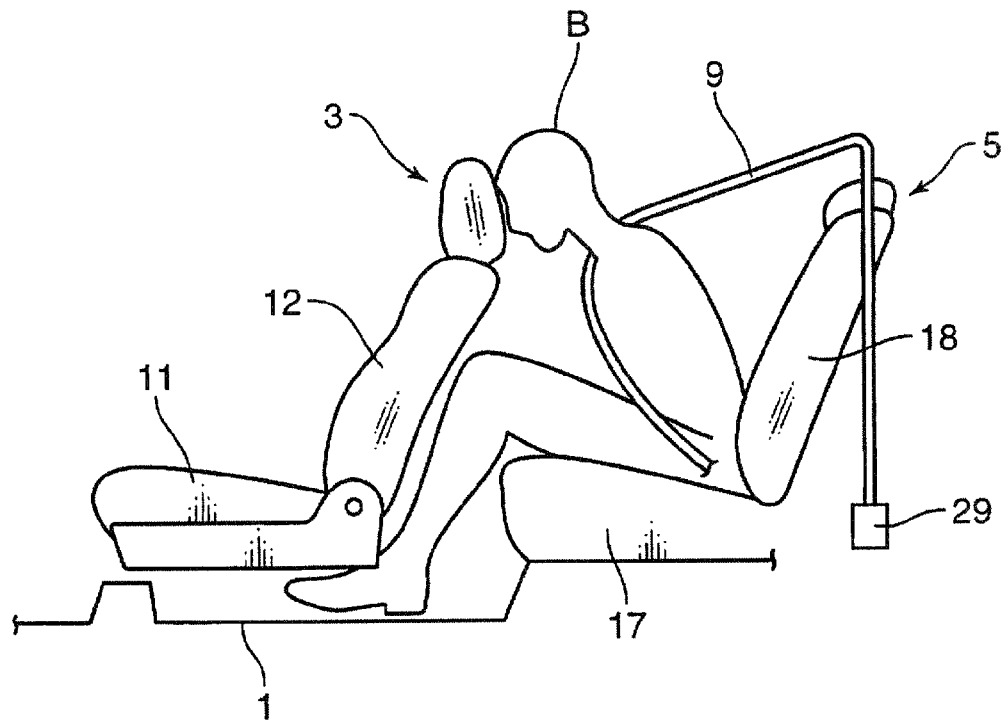
Figure 12B:
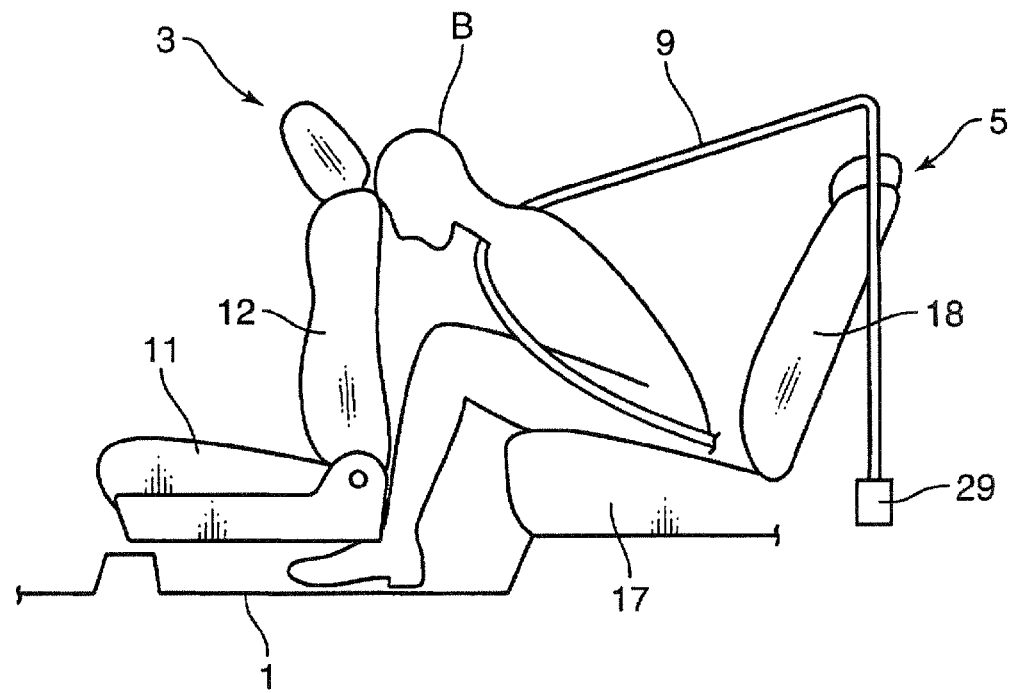

In the above rear-seat occupant protection apparatus, even if a lock by the lock device 44 is released in response to detection of a frontal collision of the vehicle (i.e., even if each of the pins 153 is retracted to release an engagement between each of the pins 153 and a corresponding one of a plurality of through-holes 156), the seat back 12 of the front seat 3 is not displaced frontwardly, just after the release. Then, when a head and/or other region of a rear-seat occupant B being displaced frontwardly according to an impact load during the frontal collision are brought into contact with the seat back 12 to apply a frontward pressing force to the seat back 12, as shown in FIG. 12A, the seat back 12 will be displaced frontwardly by a given distance or angle, as shown in FIG. 12B.

In the above structure, depending on a relationship between the diameter of each of the pins 153 and the groove width of the corresponding one of the shallow grooves 157, the sliding resistance occurring therebetween can excessively increase. In this case, even if the head and/or other region of the rear-seat occupant B are brought into contact with the seat back 12 during a frontal collision of the vehicle, the seat back 12 is likely to be not easily displaced frontwardly to apply a large impact to the head and/or other region of the rear-seat occupant B. Thus, the diameter of each of the pins 153 and the groove width of the corresponding one of the shallow grooves 157 should be determined in consideration of preventing an impact received by the rear-seat occupant B from excessively increasing due to the sliding resistance therebetween.

In the rear-seat occupant protection apparatus according to the second embodiment, the seat back 12 of the front seat 3 can receive a head and/or other region of the rear-seat occupant B being displaced frontwardly during a frontal collision of the vehicle, at a given force, while being displaced frontwardly. Thus, impact energy applied to the rear-seat occupant B is effectively absorbed by the seat back 12. This provides an advantage of being able to reduce an impact received by the rear-seat occupant B so as to adequately ensure safety for the rear-seat occupant B.

Particularly, in the above rear-seat occupant protection apparatus, when the rear seat 5 is equipped with a load limiting seat belt 9, impact energy applied to the rear-seat occupant B can be absorbed by both the seat belt 9 and the seat back 12 of the front seat 3. This provides an advantage of being able to adequately protect the rear-seat occupant B even if the impact energy is fairly large.

Third Embodiment

Figure 13:
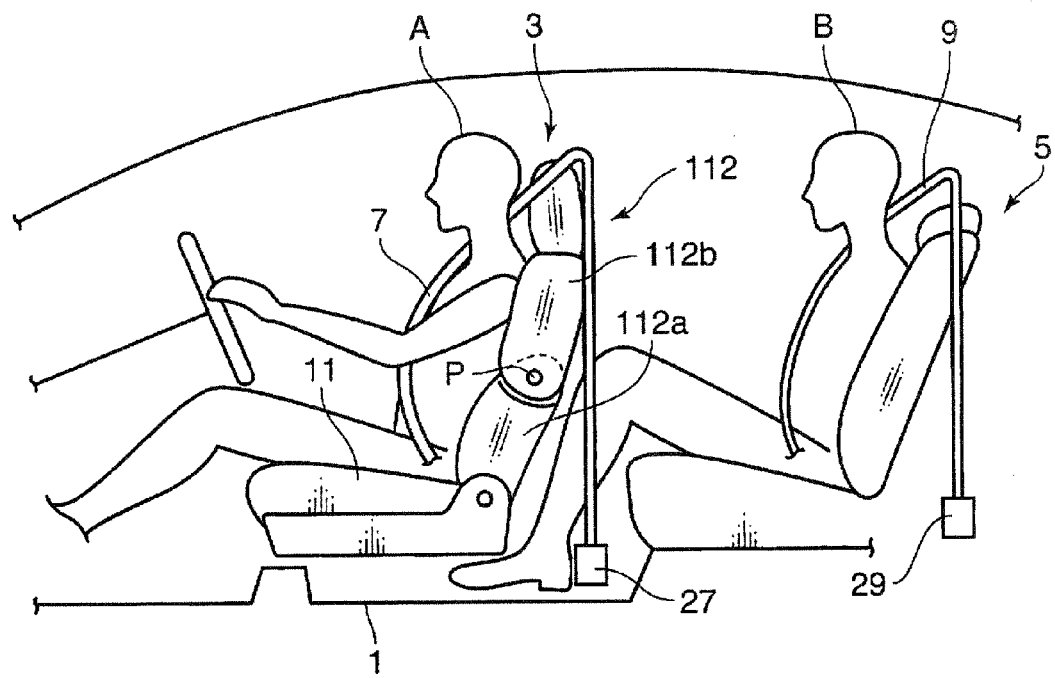
FIG. 13 is an explanatory diagram showing a rear-seat occupant protection apparatus according to a third embodiment of the present invention.
Figure 14:
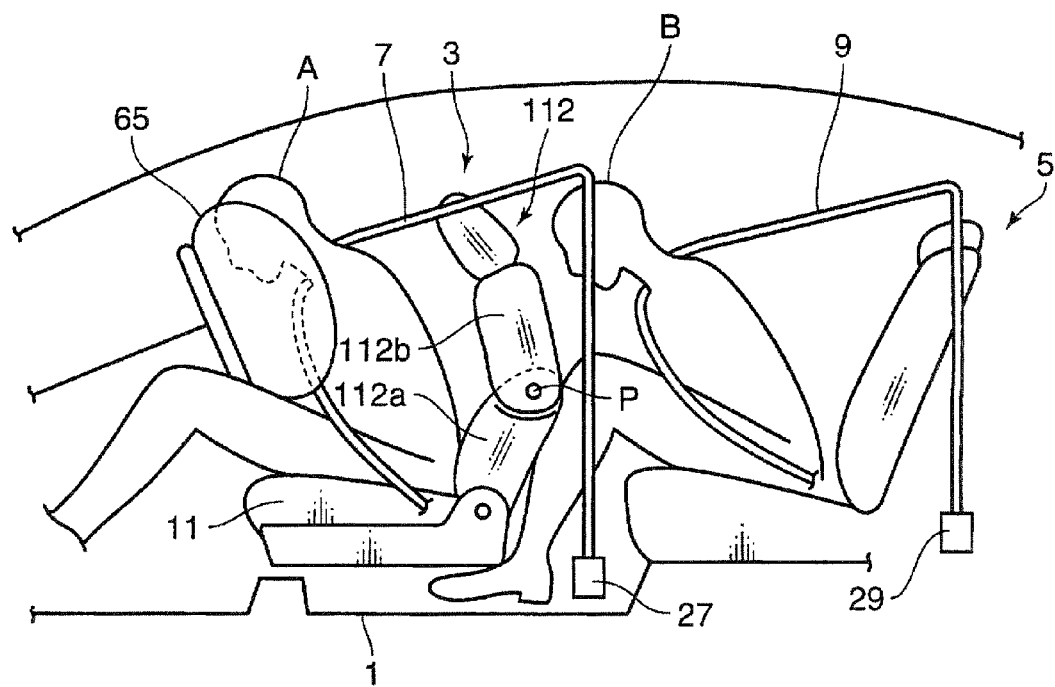
FIG. 14 is an explanatory diagram corresponding to FIG. 13, which shows a movement of a front seat and others during a frontal collision of a vehicle.

FIG. 13 is an explanatory diagram showing a rear-seat occupant protection apparatus according to a third embodiment of the present invention. As shown in FIG. 13, in the third embodiment, a seat back 112 of a front seat 3 is formed as a so-called "bendable seat back" which comprises a lower seat back 112a supported by a rear end of a seat cushion 11 of the front seat 3, and an upper seat back 112b pivotally supported by an upper end of the lower seat back 112a. Further, the seat back 112 is provided with a seat-back displacing mechanism having, for example, the same structure as that in the first embodiment, in a pivot portion P between the lower seat back 112a and the upper seat back 112b. That is, the seat-back displacing mechanism is adapted, in response to detection of a frontal collision of a vehicle, to permit the upper seat back 112b to be inclined frontwardly about the upper end of the lower seat back 112a.

In the above rear-seat occupant protection apparatus, the seat back 112 of the front seat 3 is the so-called "bendable seat back". Thus, in a normal state, a standing configuration of the upper seat back 112 can be set to more accurately conform to a posture of an upper body of a front-seat occupant A, so that the seat back 12 can support a back of the front-seat occupant A more adequately. In the event of a frontal collision of the vehicle, the seat-back displacing mechanism can permit a frontward inclining of the upper seat back 112b to effectively prevent a head of a rear-seat occupant B seated in a rear seat 5 located behind the upper seat back 112b from striking an upper end of the upper seat back 112b. Thus, the rear-seat occupant protection apparatus has an advantage of being able to adequately protect the head of the rear-seat occupant B seated behind the front seat 3 during a frontal collision of the vehicle, while adequately supporting the back of the front-seat occupant A seated in the front seat 3 in the normal state.

The above embodiments have been described based on one example where the rear-seat occupant protection apparatus of the present invention is applied to a vehicle having two rows of occupant seats composed of a front seat 3 and a rear seat 5 and arranged in a passenger compartment. Alternatively, the rear-seat occupant protection apparatus of the present invention may be applied to a vehicle having three rows of occupant seats composed of a front row seat, an intermediate row seat and a rear row seat arranged in a passenger compartment. In this case, the same seat-back displacing mechanism as that in each of the above embodiments is preferably provided in the front row seat and the intermediate row seat among the three rows of occupant seats. This provides an advantage of being able to adequately protect a head of an occupant seated in each of the intermediate row seat and the rear row seat located behind the front row seat and the intermediate row seat, respectively.

In the last place, features of the present invention disclosed based on the above embodiments and advantages thereof will be comprehensively described.

The present invention provides a rear-seat occupant protection apparatus designed to protect, during a frontal collision of a vehicle, a rear-seat occupant seated in a rear seat located behind a front seat equipped with a seat belt having a load limiter function. The rear-seat occupant protection apparatus comprises a collision detection device adapted to detect the frontal collision of the vehicle, and a seat-back displacing mechanism adapted, when the frontal collision of the vehicle is detected by the collision detection device, to permit a seat back of the front seat to be displaced frontwardly at a given timing consecutive with a frontward displacement of a front-seat occupant seated in the front seat.

In the rear-seat occupant protection apparatus of the present invention, a frontward displacement of the seat back of the front seat is permitted in response to detection of a frontal collision of the vehicle by the collision detection device. This provides an advantage of being able to effectively avoid occurrence of an undesirable situation where, when the rear-seat occupant seated behind the front seat is lunged frontwardly due to a frontward impact load applied thereto during the frontal collision of the vehicle, a head of the rear-seat occupant strikes the seat back of the front seat and receives a large impact, so as to more adequately protect the head of the rear-seat occupant.

Further, the front seat is equipped with the seat belt having the load limiter function, and the frontward displacement of the seat back of the front seat is permitted at a given timing consecutive with the frontward displacement of the front-seat occupant (i.e., a timing which is not ahead of at least the frontward displacement of the front-seat occupant) during the frontal collision of the vehicle. This provides an advantage of being able to adequately protect the head of the rear-seat occupant seated behind the front seat, while effectively avoiding a risk of spoiling safety for the front-seat occupant.

Preferably, in the rear-seat occupant protection apparatus of the present invention, the seat-back displacing mechanism includes a restriction device adapted, when the seat back of the front seat is permitted to be displaced frontwardly during the frontal collision of the vehicle, to restrict a displacement amount of the seat back of the front seat in such a manner that the amount becomes less than a displacement amount of an upper body of the front-seat occupant which is displaced frontwardly while being restrained by the seat belt having the load limiter function.

According to this feature, even if the seat back of the front seat is displaced frontwardly during the frontal collision of the vehicle, the restriction device can prevent the seat back of the front seat from being brought into contact with the upper body of the front-seat occupant to push the upper body. This provides an advantage of being able to more adequately ensure safety for the front-seat occupant.

In the rear-seat occupant protection apparatus of the present invention, the seat-back displacing mechanism is not limited to a specific structure, but various structures may be used. For example, the seat-back displacing mechanism preferably includes a lock device adapted to lock the seat back of the front seat in a given standing posture, and a control device adapted, when the frontal collision of the vehicle is detected by the collision detection device, to move an engaging pin provided in the lock device to allow the lock by the lock device to be released.

This feature has an advantage of being able to quickly permit the frontward displacement of the seat back of the front seat to adequately protect the head of the rear-seat occupant seated behind the seat back, using only a simple structure adapted to move the engaging pin of the lock device during the frontal collision of the vehicle.

It is also preferable that the seat-back displacing mechanism includes a damper device adapted to impose a given resistance force on the seat back of the front seat which is being displaced frontwardly during the frontal collision of the vehicle.

According to this feature, the seat back of the front seat can receive a head and/or other region of the rear-seat occupant being displaced frontwardly during the frontal collision of the vehicle, at a given force, while being displaced frontwardly. Thus, impact energy applied to the rear-seat occupant is effectively absorbed by the seat back of the front seat. This provides an advantage of being able to reduce an impact received by the rear-seat occupant so as to adequately ensure safety for the rear-seat occupant.

In the rear-seat occupant protection apparatus of the present invention, when the seat back of the front seat includes a lower seat back supported by a rear end of a seat cushion of the front seat, and an upper seat back pivotally supported by an upper end of the lower seat back, the seat-back displacing mechanism is preferably adapted, when the frontal collision of the vehicle is detected by the collision detection device, to permit a upper seat back to be inclined frontwardly relative to the lower seat back.

This feature has an advantage of being able to adequately protect the head of the rear-seat occupant seated behind the front seat during the frontal collision of the vehicle, while adequately supporting a back of the front-seat occupant seated in the front seat in the normal state.

Preferably, in the rear-seat occupant protection apparatus of the present invention, the rear seat is equipped with a seat belt having a load limiter function.

According to this feature, the head of the rear-seat occupant can be effectively prevented from striking the seat back of the front seat and receiving a large impact, while impact energy applied to the rear-seat occupant is effectively absorbed by the seat belt having the load limiter function. This provides an advantage of being able to more adequately protect the rear-seat occupant.

This application is based on Japanese Patent application No. 2007-310973 filed in Japan Patent Office on Nov. 30, 2007, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A rear-seat occupant protection system for a vehicle, the vehicle comprising:
    a front seat including a seat cushion and a seat back supported by the seat cushion,
    a rear seat disposed behind the front seat,
    a seat belt system including a seat belt, and end of which is fixed to a body of the vehicle and adapted to restrain an occupant seated in the front seat and to permit a frontward displacement of a body of the occupant seated in the front seat in response to a forward inertia of the body of the occupant seated in the front seat;
    wherein said rear-seat occupant protection system comprises:
        a collision detection device adapted to detect a frontal collision of the vehicle, and
        a seat-back displacing mechanism provided at a rear end of the seat cushion of the front seat;
        wherein said seat-back displacing mechanism is operative to fix the seat back to the seat cushion of the front seat in a normal state and to allow the seat back to automatically displace by pivoting frontwardly at said seat-back displacing mechanism with the frontward displacement of the body of the occupant seated in the front seat in response to a frontal impact load applied thereto during a frontal collision of the vehicle when detected by said collision detection device.

2. The rear-seat occupant protection system as defined in claim 1,
    wherein said seat-back displacing mechanism includes a restriction device adapted, when said seat back of said front seat is permitted to be displaced frontwardly during the frontal collision of the vehicle, to restrict a displacement amount of said seat back of said front seat in such a manner that the amount becomes less than a displacement amount of an upper body of said front-seat occupant which is displaced frontwardly while being restrained by said seat belt having the load limiter function.

3. The rear-seat occupant protection system as defined in claim 1,
    wherein said seat-back displacing mechanism includes a lock device adapted to lock said seat back of said front seat in a given standing posture, and a control device adapted, when the frontal collision of the vehicle is detected by said collision detection device, to move an engaging pin provided in said lock device to allow the lock by said lock device to be released.

4. The rear-seat occupant protection system as defined in claim 1,
    wherein said seat-back displacing mechanism includes a damper device adapted to impose a given resistance force on said seat back of said front seat which is being displaced frontwardly during the frontal collision of the vehicle.

5. The rear-seat occupant protection system as defined in claim 1,
    wherein said seat back of said front seat includes a lower seat back supported by a rear end of a seat cushion of said front seat, and an upper seat back pivotally supported by an upper end of said lower seat back; and
    said seat-back displacing mechanism is adapted, when the frontal collision of the vehicle is detected by said collision detection device, to permit an upper seat back to be inclined frontwardly relative to said lower seat back.

6. The rear-seat occupant protection system as defined in claim 1, wherein said rear seat is equipped with a seat belt having a load limiter function.

7. The rear-seat occupant protection system as defined in claim 1, wherein said seat belt for the front seat has one end windably held by a retractor provided in the vehicle other than the front seat.

8. The rear-seat occupant protection system as defined in claim 1, wherein said seat belt for the front seat has one end windably held by a retractor provided inside a lateral wall of the vehicle.

9. A rear-seat occupant protection system for a vehicle, the vehicle comprising:
    a front seat including a seat cushion and a seat back supported by the seat cushion,
    a rear seat disposed behind the front seat, and
    a seat belt system including a seat belt, an end of which is fixed to a body of the vehicle and adapted to restrain an occupant seated in the front seat and to permit a frontward displacement of a body of the occupant seated in the front seat in response to a forward inertia of the body of the occupant seated in the front seat;
    wherein said rear-seat occupant protection system comprises:
        a collision detection system adapted to detect a frontal collision of the vehicle, and
        a seat-back displacing mechanism provided at a rear end of the seat cushion of the front seat;
            wherein said seat-back displacing mechanism is operative to fix the seat back to the seat cushion of the front seat in a normal state and to allow the seat back of the front seat to be displaced by pivoting frontwardly at said seat-back displacing mechanism in response to a frontward pushing force applied to the seat back by an occupant seated in the rear seat during a frontal collision of the vehicle when detected by said collision detection device.

10. The rear-seat occupant protection system as defined in claim 9,
wherein said seat-back displacing mechanism includes a restriction device adapted, when said seat back of said front seat is permitted to be displaced frontwardly during the frontal collision of the vehicle, to restrict a displacement amount of said seat back of said front seat in such a manner that the amount becomes less than a displacement amount of an upper body of said front-seat occupant which is displaced frontwardly while being restrained by said seat belt having the load limiter function.

11. The rear-seat occupant protection system as defined in claim 9,
wherein said seat-back displacing mechanism includes a lock device adapted to lock said seat back of said front seat in a given standing posture, and a control device adapted, when the frontal collision of the vehicle is detected by said collision detection device, to move an engaging pin provided in said lock device to allow the lock by said lock device to be released.

12. The rear-seat occupant protection system as defined in claim 9,
wherein said seat-back displacing mechanism includes a damper device adapted to impose a given resistance force on said seat back of said front seat which is being displaced frontwardly during the frontal collision of the vehicle.

13. The rear-seat occupant protection system as defined in claim 9,
wherein said seat back of said front seat includes a lower seat back supported by a rear end of a seat cushion of said front seat, and an upper seat back pivotally supported by an upper end of said lower seat back; and
said seat-back displacing mechanism is adapted, when the frontal collision of the vehicle is detected by said collision detection device, to permit an upper seat back to be inclined frontwardly relative to said lower seat back.

14. The rear-seat occupant protection system as defined in claim 9, wherein said rear seat is equipped with a seat belt having a load limiter function.

15. The rear-seat occupant protection system as defined in claim 9, wherein said seat belt for the front seat has one end windably held by a retractor provided in the vehicle other than the front seat.

16. The rear-seat occupant protection system as defined in claim 9, wherein said seat belt for the front seat has one end windably held by a retractor provided inside a lateral wall of the vehicle.

* * * * *